United States Patent [19]

Daniel

[11] 3,831,870
[45] Aug. 27, 1974

[54] DEVICE FOR WINDING FLEXIBLE ELEMENTS CONNECTED END-TO-END BY A JOINT

[76] Inventor: Edmond Daniel, Saulx-Les-Chartreux, France

[22] Filed: Jan. 18, 1973

[21] Appl. No.: 324,804

[30] Foreign Application Priority Data
Feb. 1, 1972  France .......................... 72.03354

[52] U.S. Cl. ............................. 242/18 A, 242/25 A
[51] Int. Cl. ........................................... B65h 54/02
[58] Field of Search.... 242/54 R, 25 A, 18 A, 25 R, 242/118.41, 125

[56] References Cited
UNITED STATES PATENTS
3,690,575   9/1972   Ito et al. ........................... 242/18 A FOREIGN PATENTS OR APPLICATIONS
1,199,734   7/1970   Great Britain ................... 242/25 A Primary Examiner—John W. Huckert
Assistant Examiner—Jon W. Henry
Attorney, Agent, or Firm—Cameron, Kerkam, Sutton, Stowell & Stowell

[57] ABSTRACT

A device for winding flexible elements connected end-to-end by a joint in which a first drum receives the first element, a pulley carrying a battle-dore operable to extend over and move with the first drum upon arrival of the joint receives the regions of the elements to either end of the joint and a second drum, coaxial with the first receives the second element.

5 Claims, 10 Drawing Figures

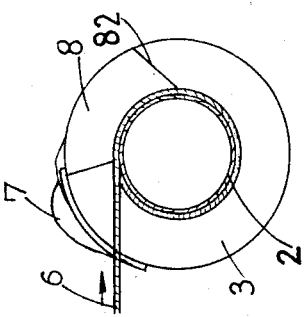
FIG:1
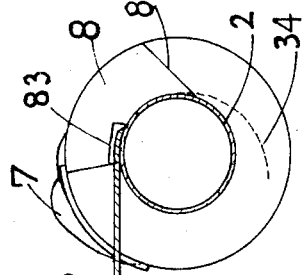
FIG:2
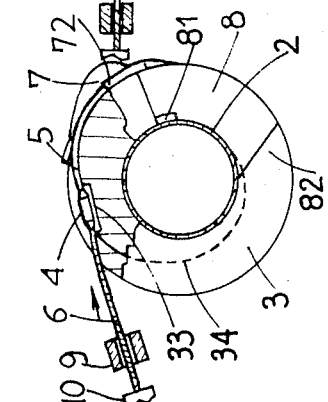
FIG:3 FIG:5 FIG:7
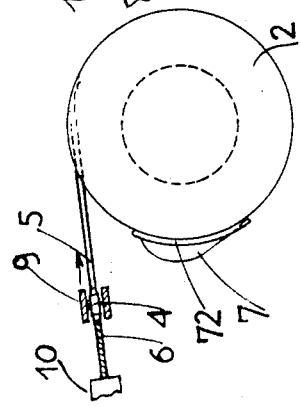
FIG:4 FIG:6 FIG:8

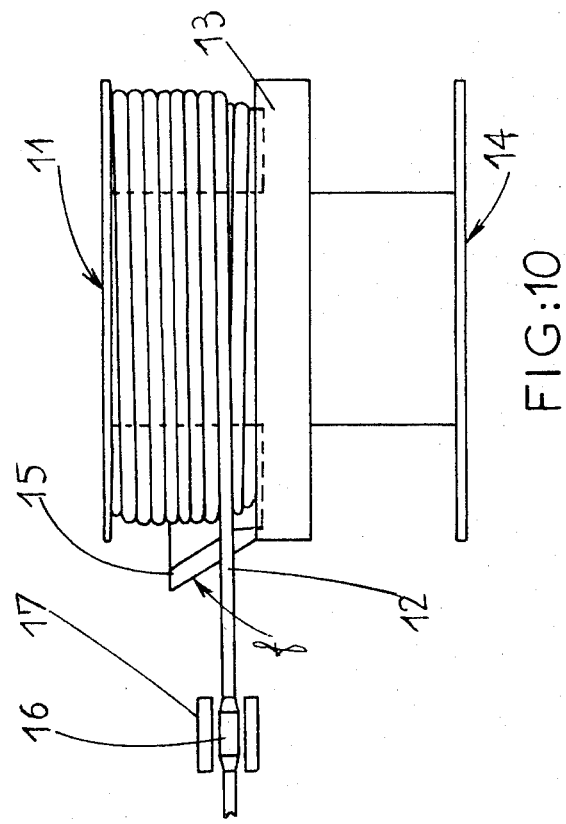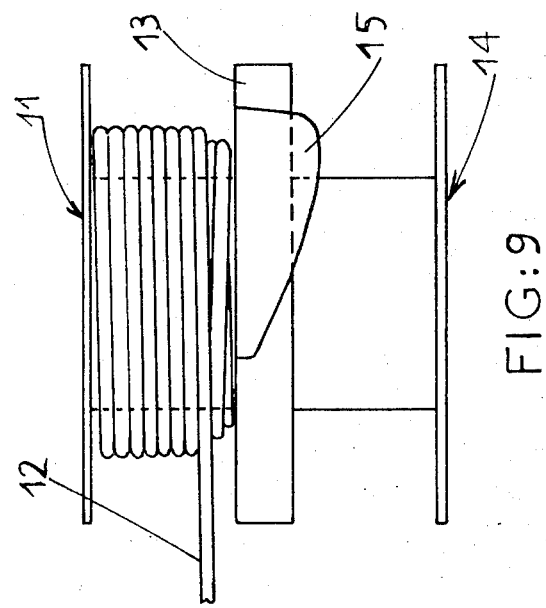

DEVICE FOR WINDING FLEXIBLE ELEMENTS CONNECTED END-TO-END BY A JOINT

The present invention relates to a device which permits winding and storage on drums of elongate flexible elements such as tubes or cables joined end-to-end by rigid joints.

The very frequent alternate deflections undergone by long flexible elements such as tubes or cables while being wound onto a drum are determinative of the life of such elements, and the deflections depend particularly on the diameter of the drum. When the elements are connected end-to-end by joints, their winding involves deflections which are of still greater magnitude at the region of the joints. The life of the joint is thus diminished. The winding of flexible, jointed elements on conventional drums is also disturbed by the joints, and the strands which are coupled with the jointed strands themselves undergo greater deflections.

The device according to the invention permits elongate flexible elements, such as cables or tubes, coupled by rigid joints to be wound on to drums, without prejudicial deflections engendered at the joints. The device is particularly applicable to winding and storage on drums of telephone cables, drilling lines or oil lines, and submarine towing cables.

In accordance with the invention there is provided a device characterised in that it comprises at least one drive drum juxtaposed to a pulley and a symmetrical coaxial drum, means to rigidly connect the drive drum and the other drum and the pulley, such means being operable to allow the pulley to rotate relative to the drive drum and by the fact that the pulley, having a diameter greater than that of the drums, has a helical groove opening tangentially flush with one of the drums and carries at its periphery, in front of the start of the groove, a battledore for guiding the flexible element into the said groove, and by a travelling guide for controlling motion of the element during winding onto a drum, its passage onto the pulley and its winding onto the following drum in the direction of the length of the drum axes.

In accordance with another feature of the invention, the battledore is fixedly mounted on the pulley, projecting over the drum with which the winding starts, the pulley bearing the battledore being normally disconnected from the said drum, in a waiting position in which the battledore is disengaged from the tensioned run of the flexible element.

In accordance with another feature of the invention, the battledore is mounted to swivel on the pulley between a position projecting over the drum situated next to the start of the pulley groove and a position disengaged from the said drum.

The present invention will be better understood with the assistance of the following description which refers to particular embodiments, offered by way of example and illustrated in the attached drawings.

FIGS. 1 and 2 show in elevation and in plan respectively a first embodiment of the apparatus of the invention, of the type with two storage drums and with a battledore mounted fixed on the pulley, the latter being in the waiting position.

FIGS. 3 and 4 show the apparatus of the preceding Figures, with the flexible element beginning to be positioned in the pulley.

FIGS. 5 and 6 show the preceding apparatus in the phase corresponding to the commencement of winding of the flexible element on the second drum.

FIGS. 7 and 8 show the apparatus with a more complete winding on the said drum.

FIG. 9 shows a second embodiment of the apparatus of the invention, of the type with a battledore mounted to pivot on the pulley, the said battledore being retracted to free the drum in use.

FIG. 10 shows the latter apparatus with the battledore swung back over the turns, after location of a joint.

As shown in FIGS. 1 and 2, the apparatus includes drums 1 and 2, separated by a pulley 3 used for winding one turn with a connection joint such as 4 connecting flexible elements 5 and 6. Flexible elements 5 and 6 are guided by a travelling guide 10 which is itself known. Flexible element 5 is wound on drum 1, flexible element 6 being wound on drum 2 after reception of the joint 4 on pulley 3. Pulley 3 has a groove 31 permitting transfer of winding from one drum to the other. Groove 31 is in the form of a helix, with a depth increasing from the rim 32 of the pulley to the rim 21 of the waiting drum 2. Groove 31 is preceded by a battledore 7 fixedly mounted on the pulley and projecting over the drum 1 in use. This battledore 7 forms an outer surface in the form of a truncated cone 71 inclined to the axis of the drums and of the pulley and has a raised edge 72, this enabling flexible element 5 to be guided into groove 31.

During storage of flexible element 5 on drum 1, pulley 3 must be disconnected for rotation from the said drum 1 and locked by a known mechanism (not shown) in a waiting position such that no part of the battledore is positioned in the path of flexible element 5. This pulley 3 must be rigidly connected to drum 1 by means of a known coupling, such as a clutch, to enable the flexible element to be wound on the said pulley and on drum 2. After connection of pulley 3 to drum 1, drum 2 must turn at the same velocity as pulley 3 and drum 1. In an arrangement answering to the latter condition, drum 2 is rigidly connected to drum 1, pulley 3 being mounted freely relative to these two drums. In another arrangement, drum 2 is rigidly connected for rotation to pulley 3, the whole being mounted freely relative to the drum and able to be rigidly connected to it for rotation by the coupling mentioned above.

The operation of a winding apparatus of the invention, such as described above, will now be described.

As joint 4 approaches drum 1 it is sensed by an element 9. This passage of the joint past element 9 simultaneously causes the coupling of pulley 3 to drum 1 and the lateral displacement of the travelling guide 10 towards the pulley. During rotation of pulley 3, flexible element 5 is caught by battledore 7 and positions itself in groove 31, the cross-travelling system then being positioned level with the pulley (FIGS. 3 and 4). The sensing of the joint and the engagement of the pulley from its waiting position are so effected that, as the flexible element is wound on the pulley, joint 4 is positioned in cavity 33 which avoids bending at the connections. After being wound in helical groove 31 opening tangentially flush with drum 2, flexible element 6 starts to wind (FIGS. 5 and 6) on the said drum, the travelling guide 10 being moved across simultaneously. The outlet of groove 31 in the side 35 of the pulley is closeable by a gate 8 mounted on the pulley, by means of a hinge 82. As the flexible element leaves pulley 3, this gate is in the open position under the influence of a spring (not shown). Closure of gate 8 will give a continuous cheek 35 producing better winding and better overlaying of the flexible element 6. This closure of gate 8 takes place on winding of the second turn which pushes back the said gate by means of a stud 81 equal in width to the diameter of the flexible element, the said stud passing through an opening 83. When drum 2 is emptied, unwinding of this same turn will free gate 8 to be automatically opened.

FIGS. 9 and 10 show another embodiment of the apparatus of the invention. The apparatus includes a drum 11 on which flexible element 12 is firstly wound, a pulley 13 and a drum 14 which is rigidly connected to the said pulley or to the said drum 11. Pulley 13 is mounted freely relative to drum 11, so as to be able to turn relative to the latter. Pulley 13 bears a hinged battledore 15. When flexible element 12 is wound on drum 11, battledore 15 is swung back towards drum 11 (FIG. 9). Pulley 13 is normally coupled to drum 11 in known manner during winding.

The operation of the apparatus will now be disclosed below with reference to FIG. 10.

Detection of joint 16, on passage of the piece or of detector 17, is followed by stoppage of winding. Pulley 13 in the same manner as drum 14, possibly directly after unlocking or disengagement, is rotated relative to drum 11 so that, after recommencement of winding, joint 16 fits into its housing provided in the pulley, battledore 15 being swivelled into its work position in the direction of arrow *f* and locked. These operations can be carried out manually or automatically.

Of course, the invention is not strictly limited to the details of the embodiments just described, these being modifiable by equivalent techniques or supplemented by any useful integer.

I claim:

1. A device for winding a flexible element of components connected end-to-end by a joint comprising at least one drive drum, a pulley coaxial with said drive drum, a second drum coaxial with said drive drum, means for connecting said drive drum, said second drum and said pulley for rotation to-gether, means for allowing said pulley to rotate relative to said drive drum, said pulley having a diameter greater than that of said drums, a helical groove in said pulley opening tangentially flush with one of said drums, a battledore on the periphery of said pulley, in front of the start of said groove for guiding the flexible element into the said groove, and a travelling guide for controlling motion of the flexible element during winding onto said drive drum, onto said pulley and onto said second drum along the axis of said drums.

2. A device as described in claim 1, said battledore being inclined to the axis of said drums and fixed relative to said pulley and projecting over said drive drum adjacent the opening of said helical groove.

3. A device as described in claim 1 said battledore being hinged on said pulley, between a position projecting over said drive drum adjacent the opening of said helical groove and a position away from said drive drum.

4. A device as described in claim 1 wherein said means for connecting includes means rigidly connecting said drums to each other.

5. A device as described in claim 1 wherein said means for connecting includes means rigidly connecting said second drum to said pulley.

* * * * *

UNITED STATES PATENT OFFICE
CERTIFICATE OF CORRECTION

Patent No. 3,831,870          Dated August 27, 1974

Inventor(s) Edmond Daniel

It is certified that error appears in the above-identified patent and that said Letters Patent are hereby corrected as shown below:

On the title page the following should be added:

-- [73] Assignee: Creusot-Loire, Paris, France --

In the Claims:

Claim 1, column 4, line 9, "to-gether" should be
-- together --.

Signed and sealed this 10th day of December 1974.

(SEAL)
Attest:

McCOY M. GIBSON JR.          C. MARSHALL DANN
Attesting Officer            Commissioner of Patents